(12) United States Patent
Yang (10) Patent No.: US 9,701,303 B2
(45) Date of Patent: Jul. 11, 2017

(54) METHOD AND SYSTEM FOR SHIFTING A GEAR OF A HYBRID ELECTRIC VEHICLE

(71) Applicant: BEIQI FOTON MOTOR CO., LTD., Beijing (CN)

(72) Inventor: Weibin Yang, Beijing (CN)

(73) Assignee: BEIQI FOTON MOTOR CO., LTD., Beijing (CN)

( * ) Notice: Subject to any disclaimer, the term of this patent is extended or adjusted under 35 U.S.C. 154(b) by 0 days.

(21) Appl. No.: 14/743,639

(22) Filed: Jun. 18, 2015

(65) Prior Publication Data
US 2015/0367840 A1 Dec. 24, 2015

(30) Foreign Application Priority Data

Jun. 18, 2014 (CN) .......................... 2014 1 0274202

(51) Int. Cl.
*B60L 9/00* (2006.01)
*B60L 11/00* (2006.01)
(Continued)

(52) U.S. Cl.
CPC ............ *B60W 20/30* (2013.01); *B60W 10/08* (2013.01); *B60W 10/10* (2013.01); *B60W 20/40* (2013.01);
(Continued)

(58) Field of Classification Search
CPC ......... B60W 2510/0604; B60W 20/10; B60W 10/113; B60W 20/20; B60W 50/14; B60W 10/026; B60W 10/101; B60W 10/107; B60W 10/18; B60W 10/103; B60W 2510/081; B60W 2540/12; B60W 2050/0089; B60W 2510/0676; B60W 2510/1005; F16H 61/686; F16H 61/02;
(Continued)

(56) References Cited

U.S. PATENT DOCUMENTS 4,335,429 A * 6/1982 Kawakatsu ............ B60K 6/387
180/65.23
5,826,671 A * 10/1998 Nakae ..................... B60K 6/445
123/179.4
(Continued)

FOREIGN PATENT DOCUMENTS

CN 101585359 A 11/2009
CN 102371998 A 3/2012

*Primary Examiner* — Jelani Smith
*Assistant Examiner* — Luis A Martinez Borrero
(74) *Attorney, Agent, or Firm* — David D. Brush; Westman, Champlin & Koehler, P.A.

(57) ABSTRACT

A method and a system for shifting a gear of a hybrid electric vehicle are provided. The method includes following steps. A state of a battery is determined according to a remaining capacity of the battery, a required torque and a state of the hybrid electric vehicle, in which the state of the battery comprises a discharging state or a charging state. A plurality of optional target gears, a torque and a rotating speed of an engine corresponding to each optional target gear are determined according to the state of the battery and a speed of the hybrid electric vehicle. An optional target gear with a minimum fuel consumption of the engine is selected as a target gear from the plurality of optional target gears. It is determined whether to perform a gear shift by comparing with a current gear.

12 Claims, 5 Drawing Sheets

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60W 20/30* | (2016.01) |
| *B60W 20/40* | (2016.01) |
| *B60W 10/10* | (2012.01) |
| *B60W 10/08* | (2006.01) |
| *F16H 61/02* | (2006.01) |
| *F16H 59/70* | (2006.01) |
| *F16H 59/44* | (2006.01) |
| *F16H 59/36* | (2006.01) |
| *F16H 59/14* | (2006.01) |
| *F16H 59/68* | (2006.01) |
| *F16H 61/00* | (2006.01) |

(52) U.S. Cl.
CPC . *F16H 61/0213* (2013.01); *B60W 2510/0638* (2013.01); *B60W 2510/0657* (2013.01); *B60W 2510/083* (2013.01); *B60W 2510/1005* (2013.01); *B60W 2510/244* (2013.01); *B60W 2520/10* (2013.01); *B60W 2710/1005* (2013.01); *F16H 59/44* (2013.01); *F16H 59/70* (2013.01); *F16H 2059/148* (2013.01); *F16H 2059/366* (2013.01); *F16H 2059/6815* (2013.01); *F16H 2061/0015* (2013.01); *Y02T 10/76* (2013.01); *Y10S 903/93* (2013.01); *Y10S 903/945* (2013.01)

(58) Field of Classification Search
CPC .......... F16H 61/04; F16H 61/68; F16H 59/44; F16H 59/48; F16H 59/66; F16H 59/50; F16H 59/70
USPC ..... 701/22, 54, 51, 55, 53, 52, 28, 110, 113, 701/49, 56, 67, 123, 36, 100, 118, 21, 701/533, 102, 3, 18, 124; 180/65.265, 180/65.235, 65.275; 903/945, 947, 902, 903/910, 918
See application file for complete search history.

(56) References Cited

U.S. PATENT DOCUMENTS

| | | | | | |
|---|---|---|---|---|---|
| 5,989,155 | A | * | 11/1999 | Wadas | B60W 10/06 477/111 |
| 6,076,032 | A | * | 6/2000 | Kuroda | B60W 30/18 477/97 |
| 6,090,007 | A | * | 7/2000 | Nakajima | B60K 6/485 477/15 |
| 6,166,449 | A | * | 12/2000 | Takaoka | B60K 6/26 290/40 A |
| 6,230,496 | B1 | * | 5/2001 | Hofmann | B60K 6/105 180/65.27 |
| 6,278,915 | B1 | * | 8/2001 | Deguchi | B60K 6/543 180/65.235 |
| 6,330,498 | B2 | * | 12/2001 | Tamagawa | B60K 6/28 180/65.26 |
| 6,428,444 | B1 | * | 8/2002 | Tabata | B60K 6/48 180/65.225 |
| 6,832,147 | B2 | * | 12/2004 | Vornehm | B60W 10/06 123/349 |
| 7,040,433 | B2 | * | 5/2006 | Yamamoto | B60K 6/44 180/65.225 |
| 7,690,457 | B2 | * | 4/2010 | Nakanowatari | B60K 6/365 180/65.21 |
| 7,962,257 | B2 | * | 6/2011 | Kaya | B60K 6/445 180/65.265 |
| 8,282,531 | B2 | * | 10/2012 | Ishido | F16H 61/66259 477/110 |
| 9,026,290 | B2 | * | 5/2015 | Kabe | B60L 11/14 180/65.265 |
| 2002/0033059 | A1 | * | 3/2002 | Pels | B60K 6/26 74/329 |
| 2002/0062183 | A1 | * | 5/2002 | Yamaguchi | B60K 6/46 701/22 |
| 2004/0077448 | A1 | * | 4/2004 | Oshidari | B60K 17/04 475/5 |
| 2007/0227791 | A1 | * | 10/2007 | Ueno | B60K 6/387 180/65.245 |
| 2009/0118915 | A1 | * | 5/2009 | Heap | B60K 6/365 701/51 |
| 2009/0236160 | A1 | * | 9/2009 | Tanaka | B60K 6/365 180/65.265 |
| 2010/0179714 | A1 | * | 7/2010 | Tani | B60W 20/12 701/22 |
| 2013/0151056 | A1 | * | 6/2013 | Nakano | B60K 6/46 701/22 |
| 2013/0211650 | A1 | * | 8/2013 | Tashiro | B60W 10/06 701/22 |
| 2014/0229043 | A1 | * | 8/2014 | Frank | B60W 20/20 701/22 |
| 2014/0229048 | A1 | * | 8/2014 | Kawata | B60K 6/48 701/22 |
| 2015/0006000 | A1 | * | 1/2015 | Kawata | B60K 6/48 701/22 |

* cited by examiner

METHOD AND SYSTEM FOR SHIFTING A GEAR OF A HYBRID ELECTRIC VEHICLE

CROSS REFERENCE TO RELATED APPLICATION

This application claims priority to and benefits of Chinese Patent Application No. 201410274202.5, filed with State Intellectual Property Office on Jun. 18, 2014 the entire contents of which are incorporated herein by reference.

FIELD

Embodiments of the present disclosure generally relate to a method for controlling a hybrid electric vehicle, and more particularly, to a method and system for shifting a gear of a hybrid electric vehicle.

BACKGROUND

A hybrid electric vehicle (HEV) is a vehicle which has a driving system consisting of two or more single driving systems able to operate at the same time, in which a driving power of the vehicle is provided by the single driving systems solely or collectively according to an actual driving state of the vehicle. Due to differences of various components, arrangement manners of the various components and control strategies, there results in a plurality of kinds of driving systems. The energy conservation and low emission of the hybrid electric vehicle have gotten a lot of attention in the automobile industry, and have been the focuses of corresponding searches and developments.

In order to keep a good state of the driving hybrid electric vehicle, it is required for the hybrid electric vehicle to shift the gear. Currently, a shift schedule of two parameters (an accelerator and a speed of the vehicle) and a shift schedule of three parameters (an accelerator, a speed of the vehicle and an accelerated velocity) are widely used. However, the shift schedules of two parameters and three parameters are based on the conventional vehicle only having an engine, and are not suitable for the hybrid electric vehicle having double power sources (the engine and the motor). In addition, there may be some problems like big difficulty, poor energy efficiency. etc. in related art for controlling the hybrid electric vehicle.

SUMMARY

A first aspect of the present disclosure discloses a method for shifting a gear of a hybrid electric vehicle.

A second aspect of the present disclosure discloses a system for shifting a gear of a hybrid electric vehicle.

Embodiments of the first aspect of the present disclosure provide a method for shifting a gear of a hybrid electric vehicle, including: determining a state of a battery according to a remaining capacity of the battery, a required torque and a state of the hybrid electric vehicle, wherein the state of the battery comprises a discharging state or a charging state; determining a plurality of optional target gears and a torque and a rotating speed of an engine corresponding to each optional target gear according to the state of the battery and a speed of the hybrid electric vehicle; selecting an optional target gear with a minimum fuel consumption of the engine as a target gear from the plurality of optional target gears; and determining whether to perform a gear shift by comparing with a current gear.

In some embodiments, determining a state of a battery according to a remaining capacity of the battery, a required torque and a state of the hybrid electric vehicle includes: determining the battery is in the discharging state, if the remaining capacity of the battery is larger than a first threshold; determining the battery is in the charging state, if the remaining capacity of the battery is less than a second threshold, in which the second threshold is less than the first threshold; determining the battery is in the discharging state, if the remaining capacity of the battery is larger than the second threshold and less than the first threshold and the required torque is larger than a predetermined threshold; keeping the battery in a previous state, if the remaining capacity of the battery is larger than the second threshold and less than the first threshold and the required torque is less than or equal to the predetermined threshold; setting the battery in the discharging state without considering the remaining capacity of the battery, if the hybrid electric vehicle has just been started.

In some embodiments, determining a plurality of optional target gears and a torque and a rotating speed of an engine corresponding to each optional target gear according to the state of the battery and a speed of the hybrid electric vehicle includes: judging whether the speed of the hybrid electric vehicle is larger than a minimum speed, if the engine is in an idling state; determining a starting gear as the optional target gear, if the speed of the hybrid electric vehicle is less than or equal to the minimum speed; determining a plurality of available gears corresponding to the speed of the hybrid electric vehicle according to a predetermined maximum rotating speed and a predetermined minimum rotating speed of the engine, if the speed of the hybrid electric vehicle is larger than the minimum speed, and obtaining the plurality of optional target gears from the plurality of available gears and the torque and the rotating speed of the engine corresponding to each optional target gear according to the state of the battery.

In some embodiments, when the battery is in the discharging state, a motor of the hybrid electric vehicle works in a power assistance mode, and obtaining the plurality of optional target gears from the plurality of available gears and the torque and the rotating speed of the engine corresponding to each optional target gear according to the state of the battery includes: determining a minimum assisted torque and a maximum assisted torque of the motor; determining an output torque of the engine corresponding to each available gear under the speed of the hybrid electric vehicle; judging whether one or more gears exist such that the required torque is satisfied when the engine outputs the output torque and an assisted torque of the motor is between the minimum assisted torque and the maximum assisted torque; if yes, determining the one or more gears as the plurality of optional target gears and obtaining the torque and the rotating speed of the engine corresponding to each optional target gear; if not, determining whether one or more gears exist such that the required torque is satisfied just by the engine; if yes, determining the one or more gears as the plurality of optional target gears and obtaining the torque and the rotating speed of the engine corresponding to each optional target gear; if not, determining whether one or more gears exist such that the required torque is satisfied when the motor outputs the maximum assisted torque and the engine provides the rest torque; if yes, determining the one or more gears as the plurality of optional target gears and obtaining the torque and the rotating speed of the engine corresponding to each optional target gear.

In some embodiments, when the battery is in the charging state, a motor works in a power generation mode, and obtaining the plurality of optional target gears from the plurality of available gears and the torque and the rotating speed of the engine corresponding to each optional target gear according to the state of the battery includes: determining a minimum power generating torque and a maximum power generating torque of the motor; determining an output torque of the engine corresponding to each available gear under the speed of the hybrid electric vehicle; judging whether one or more gears exist such that the required torque is satisfied when the engine outputs the output torque and a power generating torque of the motor is between the minimum power generating torque and the maximum power generating torque; if yes, determining the one or more gears as the plurality of optional target gears and obtaining the torque and the rotating speed of the engine corresponding to each optional target gear; if not, determining whether one or more gears exist such that a sum of the maximum power generating torque of the motor and the required torque is satisfied by the output torque of the engine; if yes, determining the one or more gears as the plurality of optional target gears and obtaining the torque and the rotating speed of the engine corresponding to each optional target gear; if not, obtaining a corresponding gear as the optional target gear when only the engine works and obtaining the torque and the rotating speed of the engine corresponding to each optional target gear.

In some embodiments, selecting an optional target gear with a minimum fuel consumption of the engine as a target gear from the plurality of optional target gears includes: determining a fuel consumption of the engine in each optional target gear according to the torque and the rotating speed of the engine corresponding to each optional target gear and by using a universal characteristic of the engine; and selecting the optional target gear with the minimum fuel consumption of the engine as the target gear.

In some embodiments of the present disclosure, determining whether to perform a gear shift by comparing with a current gear includes: determining whether a time interval between a previous gear shift and the gear shift to be performed is larger than a threshold; if yes, performing the gear shift according to the target gear; and if not, keeping the hybrid electric vehicle in the current gear.

Embodiments of the second aspect of the present disclosure provide a system for shifting a gear of a hybrid electric vehicle, including: a state determining module configured to determine a state of a battery according to a remaining capacity of the battery, a required power and a state of the hybrid electric vehicle, wherein the state of the battery comprises a discharging state or a charging state; an optional target gear determining module configured to determine a plurality of optional target gears and to determine a torque and a rotating speed of an engine corresponding to each optional target gear according to the state of the battery and a speed of the hybrid electric vehicle; a target gear determining module configured to select an optional target gear with a minimum fuel consumption of the engine as a target gear from the plurality of optional target gears; and a gear shifting module configured to determine whether to perform a gear shifting by comparing with a current gear.

In some embodiments, the state determining module includes: a first state determining unit configured to determine the battery is in the discharging state, if the remaining capacity of the battery is larger than a first threshold; a second state determining unit configured to determine the battery is in the charging state, if the remaining capacity of the battery is less than a second threshold, in which the second threshold is less than the first threshold; a third state determining unit configured to determine the battery is in the discharging state, if the remaining capacity of the battery is larger than the second threshold and less than the first threshold and the required torque is larger than a predetermined threshold; a fourth state determining unit configured to keep the battery in a previous state, if the remaining capacity of the battery is larger than the second threshold and less than the first threshold and the required torque is less than or equal to the predetermined threshold; a fifth state determining unit configured to set the battery in the discharging state without considering the remaining capacity of the battery, if the hybrid electric vehicle has just been started.

In some embodiments, the optional target gear determining module includes: a first judging unit configured to determine whether the speed of the hybrid electric vehicle is larger than a minimum speed, if the engine is in an idling speed; a first optional target gear determining unit configured to determine a starting gear as the optional target gear, if the speed of the hybrid electric vehicle is less than or equal to the minimum speed; a second optional target gear determining unit configured to determine a plurality of available gears corresponding to the speed of the hybrid electric vehicle according to a predetermined maximum torque and a predetermined minimum torque of the engine, if the speed of the hybrid electric vehicle is larger than the minimum speed, and to obtain the plurality of optional target gears from the plurality of available gears and the torque and the rotating speed of the engine corresponding to each optional target gear according to the state of the battery.

In some embodiments, the second optional target gear determining unit comprises a first determining sub-unit, when the battery is in the discharging state, a motor of the hybrid electric vehicle works in a power assistance mode and the first determining sub-unit is configured to: determine a minimum assisted torque and a maximum assisted torque of the motor; determine an output torque of the engine corresponding to each available gear under the speed of the hybrid electric vehicle; judge whether one or more gears exist such that the required torque is satisfied when the engine outputs the output torque and an assisted torque of the motor is between the minimum assisted torque and the maximum assisted torque; if yes, determine the one or more gears as the plurality of optional target gears and obtain the torque and the rotating speed of the engine corresponding to each optional target gear; if not, determine whether one or more gears exist such that the requires torque is satisfied just by the engine; if yes, determine the one or more gears as the plurality of optional target gears and obtain the torque and the rotating speed of the engine corresponding to each optional target gear; if not, determine whether one or more gears exist such that the required torque is satisfied when the motor outputs the maximum assisted torque and the engine provides the rest torque; if yes, determine the one or more gears as the plurality of optional target gears and obtain the torque and the rotating speed of the engine corresponding to each optional target gear.

In some embodiments, the second optional target gear determining unit further comprises a second determining sub-unit, when the battery is in the charging state, a motor works in a power generation mode and the second determining sub-unit is configured to: determine a minimum power generating torque and a maximum power generating torque of the motor; determine an output torque of the engine corresponding to each available gear under the speed of the hybrid electric vehicle; judge whether one or more gears exist such that the required torque is satisfied when the engine outputs the output torque and a power generating torque of the motor is between the minimum power generating torque and the maximum power generating torque; if yes, determine the one or more gears as the plurality of optional target gears and obtain the torque and the rotating speed of the engine corresponding to each optional target gear; if not, determine whether one or more gears exist such that a sum of the maximum power generating torque of the motor and the required torque is satisfied by the output torque of the engine; if yes, determine the one or more gears as the plurality of optional target gears and obtain the torque and the rotating speed of the engine corresponding to each optional target gear; if not, obtain a corresponding gear as the optional target gear when only the engine operates and obtain the torque and the rotating speed of the engine corresponding to each optional target gear.

In some embodiments, the target gear determining unit is configured to: determine a fuel consumption of the engine in each optional target gear according to the torque and the rotating speed of the engine corresponding to each optional target gear and by using a universal characteristic of the engine; and select the optional target gear with the minimum fuel consumption of the engine as the target gear.

In some embodiments, the gear shifting unit is configured to: determine whether a time interval between a previous gear shift and the gear shift to be performed is larger than a threshold; if yes, perform the gear shift according to the target gear; and if not, keep the hybrid electric vehicle in the current gear.

Embodiments of the present disclosure have following advantages with respect to the related art.

(1) According to the method for shafting a gear of a hybrid electric vehicle according to embodiments of the present disclosure, the state of the battery is determined (i.e. whether the battery is in the discharging state or the charging state is determined) according to the remaining capacity of the battery (i.e. the state of charge of the battery), the required torque and the state of the hybrid electric vehicle; the plurality of optional target gears, the torque and the rotating speed of the engine corresponding to each optional target gear are determined, after it is determined the battery is in the discharging state or the charging state; finally, the optional target gear with the minimum fuel consumption of the engine is selected from the plurality of optional target gears as the target gear and it is determined whether to perform the gear shift. The method according to embodiments of the present disclosure is suitable for a mild hybrid electric vehicle, of which the battery has a small battery capacity and the engine has a small output torque, thus avoiding conditions in which the highest gear (i.e. in the power assistance mode) or the lowest gear (i.e. in the power generation mode) in the optional target gears are selected without considering the fuel consumption of the engine and thus a poor energy saving is caused, and in which it is difficult to perform the control in the method for shifting the gear of the hybrid electric vehicle. Therefore, the method according to embodiments of the present disclosure is simple to control, familiar to environment and saves energy. The method according to embodiments of the present disclosure also is suitable for a medium hybrid electric vehicle and a full hybrid electric vehicle.

(2) With the method according to embodiments of the present disclosure, the state of the battery is determined according to the SOC of the battery, the required torque and the state of the hybrid electric vehicle, thus avoiding a condition in which the state of the battery is distinguished without an adequate consideration and is unreasonably distinguished by a SOC gradient $d_{soc}$ due to a large jump of the SOC. The state of the batter can be reflected in real time to maximum extent without a frequent state switch of the battery caused by the jump of the SOC, thus ensuring a stability of the system.

(3) With the method according to embodiments of the present disclosure, the plurality of available gears are determined according to the speed of the vehicle as an optional range for a following target gear.

(4) With the method according to embodiments of the present disclosure, when the plurality of optional target gears are obtained from the plurality of available gears, the available gear that is more suitable for a current requirement of the hybrid electric vehicle is obtained by a determination combined with the state of the battery as the optional target gear.

(5) With the method according to embodiments of the present disclosure, during determining the target gear, the optional target gear with the minimum fuel consumption of the engine is selected from the plurality of optional target gears as the target gear, in which the hybrid electric vehicle under the target gear has a minimum fuel consumption.

(6) With the method according to embodiments of the present disclosure, before the gear shift is performed, it is determined whether to perform the gear shift according to the time interval between two adjacent gear shifts so as to avoid a frequent gear shift.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Chinese Patent No. CN 101585359A discloses the problem of the gear control and the torque allocation of the hybrid electric vehicle. By adjusting the opening of the electronic throttle and the gear of the transmission, the engine can operate according to the optimal fuel economy curve. However, in this method, it is required to control the opening of the electronic throttle, which is based on cooperation of many aspects in actual applications. On one hand, it is difficult for the vehicle plant to obtain the communication protocol of the engine; on the other hand, the opening of the electronic throttle is affected by the catalyzer and the temperature of cooling liquid in the engine. Therefore, the method discloses the directions of future applications, but it is difficult to control the opening of the electronic throttle in the engine due to limitations of the technical condition of the vehicle plant.

Chinese Patent No. CN 102371998A discloses the controlling method for the gear shift and the torque allocation of the parallel hybrid electric vehicle. The real-time state parameters of the hybrid electric vehicle are detected, the output parameters corresponding to the real-time state parameters are determined by the gear shift and torque allocation comparing step, the gear of the transmission, the output torque of the engine and the output torque of the motor are controlled according to the output parameters corresponding to the real-time state parameters and thus the gear shift and torque allocation of the parallel hybrid electric vehicle are completed. However, the method is based on the plug-in hybrid electric vehicle, of which the motor has a large power, and the strategy used to determine the final gear is simple. Since the mild hybrid electric vehicle are limited by the parameters of the battery and the motor, the motor thereof has a smaller output torque, and thus this method is not suitable for the mild hybrid electric vehicle. In addition, when the vehicle drives in a certain speed range, there may be two or more gears satisfying the requirement and in this method, the highest gear or the lowest gear is selected from the two or more gears, which cannot ensure that the vehicle operates in an optimal operation state and also cannot save energy resources.

Therefore, according to the above-described analysis, there may be some problems like big difficulty, poor energy efficiency. etc. in related art for controlling the hybrid electric vehicle, and in order to overcome these problems, a method and a system for shifting a gear of a hybrid electric vehicle can be provided according to embodiments of the present disclosure, in which the method and system for shifting the gear of the hybrid electric vehicle will be described in the following with reference to attached drawings.

Embodiment 1

In embodiment 1, a method for shifting a gear of a hybrid electric vehicle is provided and includes following steps.

At step S11, a state of a battery is determined according to a remaining capacity of the battery, a required torque and a state of the hybrid electric vehicle, in which the state of the battery includes a discharging state or a charging state, i.e., it is determined whether the battery is in the discharging state or the charging state.

Specifically, since the hybrid electric vehicle has a fuel power system and a battery power system and when the battery is in different states, outputs of a power system of the hybrid electric vehicle consisting of the fuel power system and the battery power system are different, it is needed to determine whether the battery is in the discharging state or the charging state, in which the fuel power system is able to charge the battery of the battery power system. The remaining capacity of the battery is in direct proportion with a state of charge (SOC) of the battery, and thus the remaining capacity of the battery is determined by SOC data of the battery. If the remaining capacity of the battery is sufficient, the battery is in the discharging state, and when the fuel power system is short of power, the battery is required to discharge; if the remaining capacity of the battery is not sufficient, the battery is in the charging state. In addition, when the hybrid electric vehicle has just been started, the battery is in the discharging state.

At step S12, a plurality of optional target gears, a torque and a rotating speed of an engine corresponding to each optional target gear are determined according to the state of the battery and a speed of the hybrid electric vehicle.

Specifically, after the state of the battery is determined, i.e., after it is determine whether the battery is in the discharging state or the charging state, the plurality of optional target gears of the hybrid electric vehicle can be determined according to the speed of the vehicle, and the torque and the rotating speed of the engine corresponding to each optional target gear are determined, thus providing a basis for a following calculation.

At step S13, an optional target gear with a minimum fuel consumption of the engine is selected as a target gear from the plurality of optional target gears.

Specifically, in the above-described optional target gears, the speed of the vehicle and the torque of the engine corresponding to each optional target gear can be rebuild to calculate the fuel consumption of the engine, and then by using a universal characteristic of the engine, the optional target gear with the minimum fuel consumption of the engine is selected as the target gear.

At step S14, it is determined whether to perform a gear shift by comparing with a current gear.

Specifically, after the target gear is determined, the target gear is compared with the current gear. If the target gear is identical with the current gear, it is not needed to perform the gear shift; if the target gear is not identical with the current gear, the current gear is switched to the target gear, thus completing the gear shift.

With the method for shifting the gear of the hybrid electric vehicle according to embodiments of the present disclosure, the state of the battery is determined (i.e. whether the battery is in the discharging state or the charging state is determined) according to the remaining capacity of the battery (i.e. the state of charge of the battery), the required torque and the state of the hybrid electric vehicle; the plurality of optional target gears, the torque and the rotating speed of the engine corresponding to each optional target gear are determined, after it is determined the battery is in the discharging state or the charging state; finally, the optional target gear with the minimum fuel consumption of the engine is selected from the plurality of optional target gears as the target gear and it is determined whether to perform the gear shift. The method according to embodiments of the present disclosure is suitable for a mild hybrid electric vehicle, of which the battery has a small battery capacity and the engine has a small output torque, thus avoiding conditions in which the highest gear (i.e. in the power assistance mode) or the lowest gear (i.e. in the power generation mode) in the optional target gears are selected without considering the fuel consumption of the engine and thus a poor energy saving is caused, and in which it is difficult to perform the control in the method for shifting the gear of the hybrid electric vehicle. Therefore, the method according to embodiments of the present disclosure is simple to control, familiar to environment and saves energy. The method according to embodiments of the present disclosure also is suitable for a medium hybrid electric vehicle and a full hybrid electric vehicle.

Embodiment 2

Figure 1:
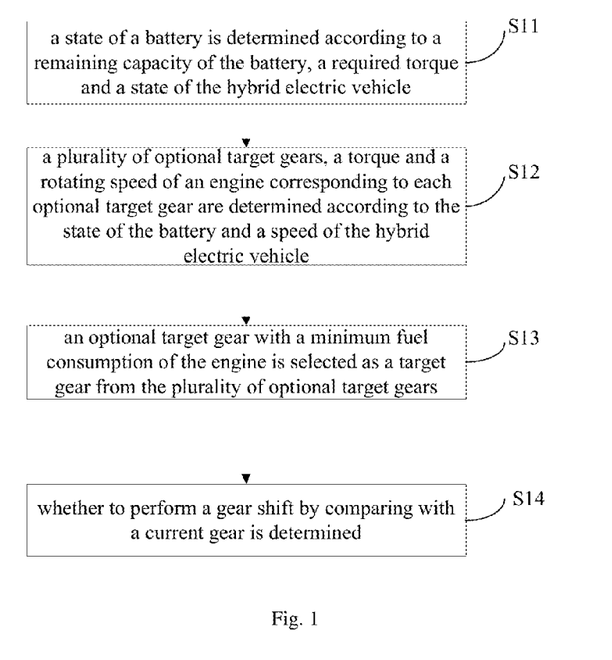
FIG. 1 is a flow chart of a method for shifting a gear of a hybrid electric vehicle according to an embodiment of the present disclosure.

In Embodiment 2, a method for shifting a gear of a hybrid electric vehicle according to an embodiment of the present is provided and includes following steps (not shown in FIG. 1).

At step S21, a state of a battery is determined according to a remaining capacity of the battery, a required torque and a state of the hybrid electric vehicle, in which the state of the battery includes a discharging state or a charging state. In other words, it is determined whether the battery is in the discharging state or the changing state.

Specifically, if the remaining capacity of the battery is larger than a first threshold, it is determined the battery is in the discharging state.

More specifically, the remaining capacity of the battery is represented by a state of charge of the battery. In some embodiments, the SOC of the battery can be described as the remaining capacity of the battery, and when the SOC of the battery is larger than an upper limit threshold, it is determined that the battery is in the discharging state.

If the remaining capacity of the battery is less than a second threshold, in which the second threshold is less than the first threshold, it is determined the battery is in the charging state. More specifically, when the SOC of the battery is less than a lower limit threshold, it is determined that the battery is in the changing state.

If the remaining capacity of the battery is larger than the second threshold and less than the first threshold and the required torque is larger than a predetermined threshold, it is determined the battery is in the discharging state; if the remaining capacity of the battery is larger than the second threshold and less than the first threshold and the required torque is less than or equal to the predetermined threshold, the battery is kept in a previous state.

More specifically, when the SOC of the battery is less than the upper limit threshold and larger than the lower limit threshold, in order to avoid a frequent state switch, the battery generally is kept in the previous state. In other words, when the SOC of the battery is jumped from the upper limit threshold to a value between the lower limit threshold and the upper limit threshold, the battery is kept in the previous discharging state; when the SOC of the battery is jumped from the lower limit threshold to a value between the lower limit threshold and the upper limit threshold, the battery is kept in the previous changing state. However, in above two processes, if the required torque is larger than the predetermined value, the battery is in the changing state, even though the SOC of the battery is between the lower limit threshold and the upper limit threshold.

In addition, the battery is set in the discharging state without considering the remaining capacity of the battery, if the hybrid electric vehicle has just been started.

In above-described methods for determining the state of the battery, a condition in which the state of the battery is distinguished without an adequate consideration and is unreasonably distinguished by a SOC gradient $d_{soc}$ due to a large jump of the SOC is avoided. Moreover, the state of the batter can be reflected in real time to maximum extent without the frequent state switch of the battery caused by the jump of the SOC, thus ensuring a stability of the system.

At step S22, a plurality of optional target gears, a torque and a rotating speed of an engine corresponding to each optional target gear are determined according to the state of the battery and a speed of the hybrid electric vehicle.

Figure 2:
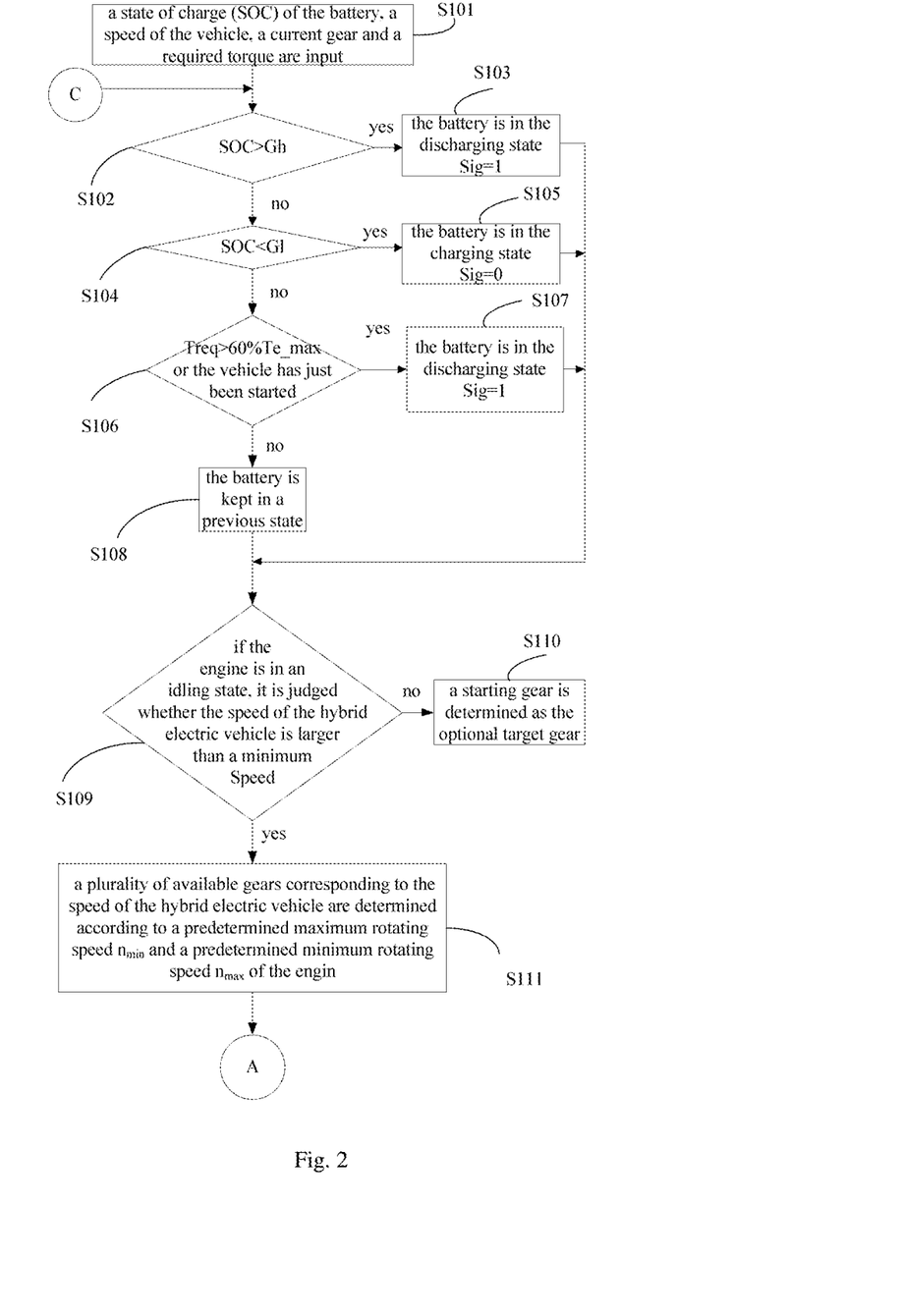
FIG. 2 is a flow chart of obtaining an available gear in a method for shifting a gear of a hybrid electric vehicle according to an embodiment of the present disclosure.
Figure 3:
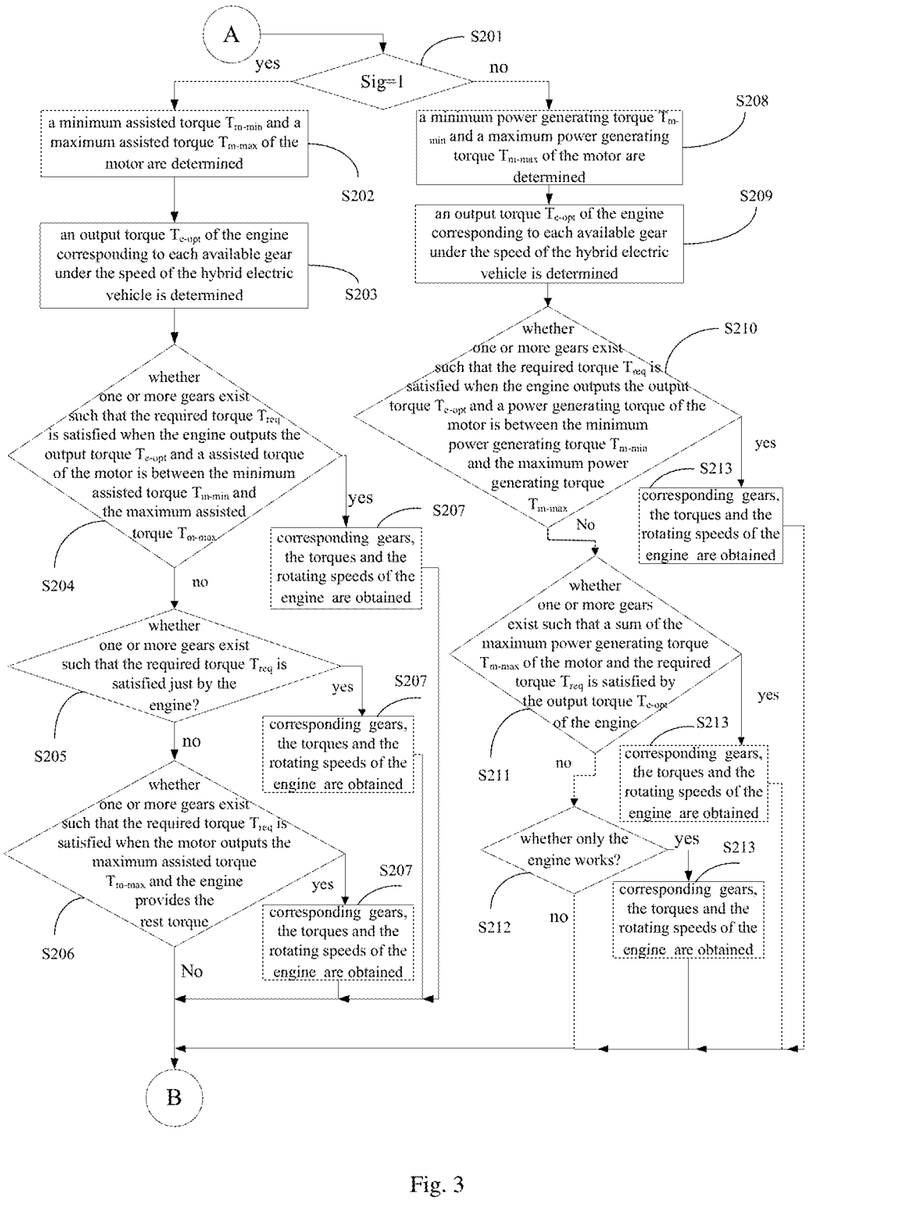
FIG. 3 is a flow chart of obtaining an optional target gear in a method for shifting a gear of a hybrid electric vehicle according to an embodiment of the present disclosure.

Specifically, if the engine is in an idling state, it is judged whether the speed of the hybrid electric vehicle is larger than a minimum speed. If the speed of the hybrid electric vehicle is less than or equal to the minimum speed, a starting gear is determined as the optional target gear; a plurality of available gears corresponding to the speed of the hybrid electric vehicle are determined according to a predetermined maximum rotating speed and a predetermined minimum rotating speed of the engine, if the speed of the hybrid electric vehicle is larger than the minimum speed, as shown in FIG. 2 (will be described in the following embodiments). Then, the plurality of optional target gears are obtained from the plurality of available gears according to the state of the battery, for which a corresponding method is shown in FIG. 3 (will be described in the following embodiments), specifically, in the method for determining the plurality of optional target gears, when the battery is in the discharging state or the charging state, the plurality of optional target gears are determined respectively.

More specifically, in a first condition, when the battery is in the discharging state, a motor of the hybrid electric vehicle works in a power assistance mode, and the method for determining the plurality of optional target gears includes following steps (not shown in FIG. 2).

At step S2101, a minimum assisted torque and a maximum assisted torque of the motor are determined. Specifically, the minimum assisted torque and the maximum assisted torque of the motor are determined according to limiting factors of the battery and the motor, a motor load rate and an efficiency factor.

At step S2102, an output torque of the engine corresponding to each available gear under the speed of the hybrid electric vehicle is determined Specifically, the output torque of the engine corresponding to each available gear under the speed of the hybrid electric vehicle is determined according to the speed of the vehicle, a speed ratio of each available gear and an optimal fuel economy curve of the engine.

At step S2103, it is judged whether one or more gears exist such that the required torque is satisfied when the engine outputs the output torque and an assisted torque of the motor is between the minimum assisted torque and the maximum assisted torque.

At step S2104, if yes, the one or more gears are determined as the plurality of optional target gears and the torque and the rotating speed of the engine corresponding to each optional target gear are obtained.

At step S2105, if not, step S2106 is executed.

At step S2106, it is determined whether one or more gears exist such that the required torque is satisfied just by the engine.

At step S2107, if yes, the one or more gears are determined as the plurality of optional target gears and the torque and the rotating speed of the engine corresponding to each optional target gear are obtained.

At step S2108, if not, step S2109 is executed.

At step S2109, it is determined whether one or more gears exist such that the required torque is satisfied when the motor outputs the maximum assisted torque and the engine provides the rest torque.

At step S2110, if yes, the one or more gears are determined as the plurality of optional target gears and the torque and the rotating speed of the engine corresponding to each optional target gear are obtained.

At step S2111, if not, step S2112 is executed.

At step S2112, if the one or more gears satisfying above corresponding conditions do not exist, the available gears under the current speed of the vehicle are determined as the target gears and the torque and the rotating speed of the engine corresponding to each optional target gear are obtained.

In a second condition, when the battery is in the charging state, the motor of the hybrid electric vehicle works in a power generation mode, and the method for determining the plurality of optional target gears includes following steps.

At step S2201, a minimum power generating torque and a maximum power generating torque of the motor are determined.

At step S2202, an output torque of the engine corresponding to each available gear under the speed of the hybrid electric vehicle is determined.

At step S2203, it is judged whether one or more gears exist such that the required torque is satisfied when the engine outputs the output torque and a power generating torque of the motor is between the minimum power generating torque and the maximum power generating torque.

At step S2204, if yes, the one or more gears as the plurality of optional target gears are determined and the torque and the rotating speed of the engine corresponding to each optional target gear are obtained.

At step S2205, if not, step S2206 is executed.

At step S2206, it is determined whether one or more gears exist such that a sum of the maximum power generating torque of the motor and the required torque is satisfied by the output torque of the engine.

At step S2207, if yes, the one or more gears are determined as the plurality of optional target gears and the torque and the rotating speed of the engine corresponding to each optional target gear are obtained.

At step S2208, if not, step S2209 is executed.

At step S2209, a corresponding gear is obtained as the optional target gear when only the engine works and the torque and the rotating speed of the engine corresponding to each optional target gear are obtained.

At step S2210, if the one or more gears satisfying above corresponding conditions do not exist, the available gears under the current speed of the vehicle are determined as the target gears and the torque and the rotating speed of the engine corresponding to each optional target gear are obtained.

At step S23, an optional target gear with a minimum fuel consumption of the engine is selected as a target gear from the plurality of optional target gears.

Specifically, firstly, a fuel consumption of the engine in each optional target gear is determined according to the torque and the rotating speed of the engine corresponding to each optional target gear and by using a universal characteristic of the engine, secondly, the optional target gear with the minimum fuel consumption of the engine is selected as the target gear.

At step S24, it is determined whether to perform a gear shift by comparing with a current gear.

Specifically, if the target gear is identical with the current gear, it is not needed to perform the gear shift; if the target gear is not identical with the current shaft, it is needed to perform the gear shift. However, before the gear shift is performed, it is further needed to determine whether a time interval between a previous gear shift and the gear shift to be performed is larger than a threshold, if yes, the gear shift is performed; if not, the hybrid electric vehicle is kept in the current gear.

With the method for shifting the gear of the hybrid electric vehicle according to embodiments of the present disclosure, it is determined whether the battery is in the discharging state or the charging state according to the remaining capacity of the battery (or the SOC of the battery), the required torque and the state of the vehicle; after it is determined the battery is in the discharging state or the charging state, the plurality of optional target gears under the speed of the vehicle are determined, and the torque and the rotating speed of the engine corresponding to each optional target gear are obtained; finally, the optional target gear with the minimum fuel consumption of the engine is selected as the target gear from the plurality of optional target gear, and it is determined whether to perform the gear shift according to the time interval between the previous gear shift and the gear shift to be performed. In the method according to embodiments of the present disclosure, the remaining capacity of the battery (or the SOC of the battery), the required torque and the state of the vehicle are used to determine the state of the battery synthetically, and thus a frequent state switch of the battery due to a SOC jump is avoided. Moreover, the optional target gear with the minimum fuel consumption of the engine is selected as the target gear from the plurality of optional target gear, and thus it is ensured that the vehicle has a minimum fuel consumption; it is determined whether to perform the gear shift according to the time interval between the previous gear shift and the gear shift to be performed, and thus a frequent gear shift is avoided.

Embodiment 3

Figure 5:
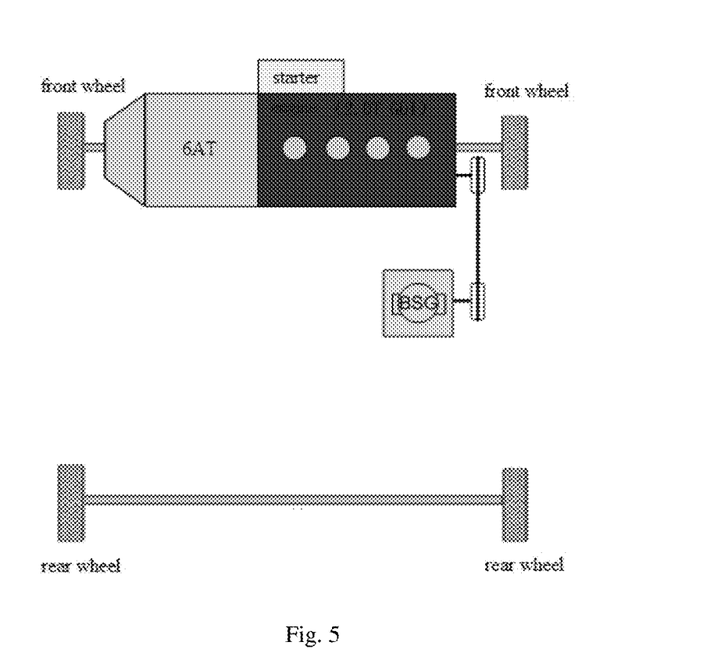
FIG. 5 is a schematic diagram of a power system in a hybrid electric vehicle according to an embodiment of the present disclosure.

FIG. 5 is schematic diagram of a hybrid power system in a hybrid electric vehicle according to an embodiment of the present disclosure. The hybrid power system includes a belt starter generator (BSG) which consists of a battery and a motor, and the BSG is connected with a crankshaft of the engine via a belt so as to transmit power to the engine. The engine transmits power to wheels of the vehicle via a 6-speed automatic transmission (6 AT). For example, a maximum output power of the BSG can be 15 kw, a voltage of the battery can be 48V and a capacity of the battery can be 20 Ah, and the output power of the batter within 10 seconds can be 15 kw.

Figure 4:
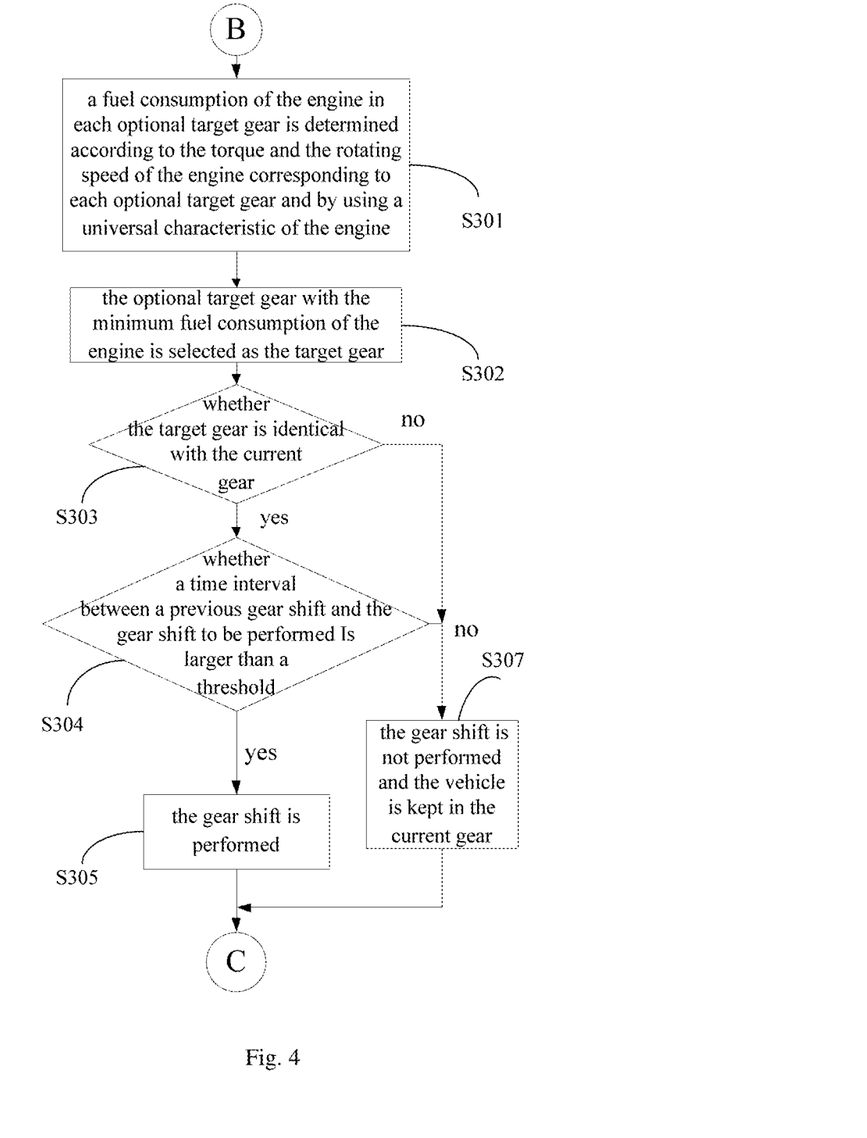
FIG. 4 is a flow chart of performing a gear shift in a method for shifting a gear of a hybrid electric vehicle according to an embodiment of the present disclosure.

As shown in above-described structures and parameters, the assisted torque and the power generating torque of the BSG are small due to limitation of the parameters of the battery and the motor. A three-step method (A, B and C shown in FIGS. 2-4) for shifting a gear of a hybrid electric vehicle is proposed according to characteristics of a mild hybrid electric vehicle, as shown in FIGS. 2-4. Specifically, the three-step method includes step S100 (i.e. C) in FIG. 2, step S200 (i.e. A) in FIG. 3 and step S300 (i.e. B) in FIG. 4.

Step S100 includes following steps.

At step S101, a state of charge (SOC) of the battery, a speed of the vehicle, a current gear and a required torque (at the wheel of the vehicle) are input in real time.

At step S102, it is determined whether the SOC of the battery is larger than a high gate $G_h$.

At step S103, if the SOC of the battery is larger than the high gate $G_h$, the battery is in the discharging state and a mark bit Sig is set to be equal to 1; if the SOC of the battery is less than or equal to the high gate $G_h$, step S104 is executed.

At step S104, it is determined whether the SOC of the battery is less than a low gate $G_l$.

At step S105, if the SOC of the battery is less than the low gate $G_l$, the battery is in a charging state and the mark bit Sig is set to be equal to 0; if the SOC of the battery is greater than or equal to the low gate $G_l$, step 106 is executed.

At step S106, the SOC of the battery is less than the high gate $G_h$ and is larger than the low gate $G_l$, and it is determined whether the required torque (at the wheel of the vehicle) $T_{req}$ is larger than a predetermined threshold such as 60% $T_{e-max}$ (in other embodiments of the present disclosure, the predetermined threshold may be set as 40%-70% $T_{e-max}$), or it is determined whether the vehicle has just been started.

At step S107, if the required torque $T_{req}$ is larger than the predetermined threshold or the vehicle has just been started, the mark bit Sig is set to be equal to 1; if not, step S108 is executed.

$T_{e-max}$ represents the torque at the wheel of vehicle output by the engine in the current gear, in which the engine operates according to an external characteristic curve. Specifically, in the mild hybrid electric vehicle, $T_{e-max}$ represents the torque at the wheel of vehicle output by the engine; in a medium or full hybrid electric vehicle, $T_{e-max}$ represents the torque at the wheel of vehicle output by both the engine and the motor.

At step S108, the battery is kept in a previous state.

At step S109, if the engine is in an idling state, it is judged whether the speed of the hybrid electric vehicle is larger than a minimum speed.

At step S110, if the speed of the hybrid electric vehicle is less than or equal to the minimum speed, a starting gear is determined as the optional target gear; if the speed of the hybrid electric vehicle is larger than the minimum speed, step S111 is executed.

At step S111, a plurality of available gears corresponding to the speed of the hybrid electric vehicle are determined according to a predetermined maximum rotating speed $n_{min}$ and a predetermined minimum rotating speed $n_{max}$ of the engine. For example, when the speed of the vehicle is 5 km/h, the plurality of available gears includes second to sixth gears.

Step S200 includes following steps.

At step S201, it is determined whether Sig=1, if yes, step S202 is executed to enter the motor into the power assistance mode; if not, step S208 is executed to enter the motor into the power generation mode;

At step S202, a minimum assisted torque $T_{m-min}$ and a maximum assisted torque $T_{m-max}$ of the motor are determined.

Specifically, the minimum assisted torque $T_{m-min}$ and the maximum assisted torque $T_{m-max}$ of the motor are determined according to limiting factors of the battery and the motor, a motor load rate and an efficiency factor.

At step S203, an output torque $T_{e-opt}$ of the engine corresponding to each available gear under the speed of the hybrid electric vehicle is determined.

Specifically, the output torque $T_{e-opt}$ of the engine corresponding to each available gear under the speed of the hybrid electric vehicle is determined according to the speed of the vehicle, a speed ratio of each available gear and an optimal fuel economy curve of the engine.

At step S204, It is judged whether one or more gears exist such that the required torque $T_{req}$ is satisfied when the engine outputs the output torque $T_{e-opt}$ and an assisted torque of the motor is between the minimum assisted torque $T_{m-min}$ and the maximum assisted torque $T_{m-max}$. If yes, step S207 is executed, i.e. the one or more gears are determined as the plurality of optional target gears and the torque and the rotating speed of the engine corresponding to each optional target gear are obtained; if not, step S205 is executed.

At step S205, it is determined whether one or more gears exist such that the required torque $T_{req}$ is satisfied just by the engine. If yes, step S207 is executed, i.e. the one or more gears are determined as the plurality of optional target gears and the torque and the rotating speed of the engine corresponding to each optional target gear are obtained; if not, step S206 is executed.

At step S206, it is determined whether one or more gears exist such that the required torque $T_{req}$ is satisfied when the motor outputs the maximum assisted torque $T_{m-max}$ and the engine provides the rest torque. If yes, step S207 is executed, i.e. the one or more gears are determined as the plurality of optional target gears and the torque and the rotating speed of the engine corresponding to each optional target gear are obtained; if not, step 200 is completed.

At step S207, the one or more gears are determined as the plurality of optional target gears and the torque and the rotating speed of the engine corresponding to each optional target gear are obtained.

At step S208, a minimum power generating torque $T_{m-min}$ and a maximum power generating torque $T_{m-max}$ of the motor are determined.

At step S209, an output torque $T_{e-opt}$ of the engine corresponding to each available gear under the speed of the hybrid electric vehicle is determined.

At step S210, it is judged whether one or more gears exist such that the required torque $T_{req}$ is satisfied when the engine outputs the output torque $T_{e-opt}$ and a power generating torque of the motor is between the minimum power generating torque $T_{m-min}$ and the maximum power generating torque $T_{m-max}$. If yes, step S213 is executed, i.e. the one or more gears as the plurality of optional target gears are determined and the torque and the rotating speed of the engine corresponding to each optional target gear are obtained; if not, step S211 is executed.

At step S211, it is determined whether one or more gears exist such that a sum of the maximum power generating torque $T_{m-max}$ of the motor and the required torque $T_{req}$ is satisfied by the output torque $T_{e-opt}$ of the engine. If yes, step S213 is executed, i.e. the one or more gears are determined as the plurality of optional target gears and the torque and the rotating speed of the engine corresponding to each optional target gear are obtained; if not, step S212 is executed.

At step S212, it is determined whether only the engine works, if yes, step S213 is executed, i.e. a corresponding gear is obtained as the optional target gear and the torque and the rotating speed of the engine corresponding to each optional target gear are obtained; if not, step S200 is completed.

At step S213, corresponding gears, the torques and the rotating speeds of the engine are obtained.

Step S300 includes following steps.

At step 301, a fuel consumption of the engine in each optional target gear is determined according to the torque and the rotating speed of the engine corresponding to each optional target gear and by using a universal characteristic of the engine.

At step S302, the optional target gear with the minimum fuel consumption of the engine is selected as the target gear.

At step S303, it is determined whether the target gear is identical with the current gear, if yes, step S304 is executed; if not, step S306 is executed, i.e. the vehicle is kept in the current gear.

At step S304, it is determined whether a time interval between a previous gear shift and the gear shift to be performed is larger than a threshold, if yes, step S305 is executed; if not, step S306 is executed.

At step S305, the gear shift is performed.

At step S306, the gear shift is not performed and the vehicle is kept in the current gear.

With the method for shifting the gear of the hybrid electric vehicle according to embodiments of the present disclosure, the SOC of the battery, the required torque and the state of the vehicle are taken into consideration to determine the state of the battery, thus avoiding an incomplete determination. Output capabilities of the engine, the motor and the battery and a lowest load rate of the motor are taken into consideration to determine the plurality of optional target gears in the speed of the vehicle so as to ensure the operation efficiency of the motor. Moreover, the optional target gear with the minimum fuel consumption of the engine is selected as the target gear from the plurality of optional target gear, and thus it is ensured that the vehicle has a minimum fuel consumption, and also, it is determined whether to perform the gear shift according to the time interval between the previous gear shift and the gear shift to be performed, thus avoiding a frequent gear shift.

The method according to embodiments of the present disclosure is suitable for the mild hybrid electric vehicle and the medium or full hybrid electric vehicle.

Embodiment 4

Figure 6:
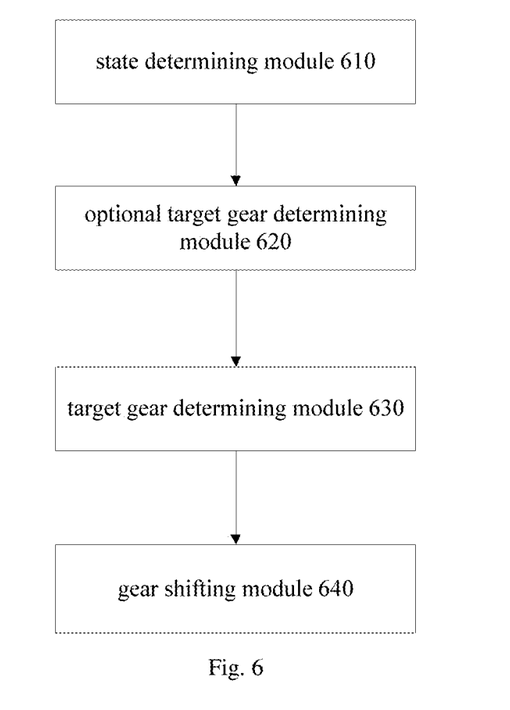
FIG. 6 is a block diagram of a system for shifting a gear of a hybrid electric vehicle according to an embodiment of the present disclosure.

In embodiment 4, a system for shifting a gear of a hybrid electric vehicle is provided, as shown in FIG. 6.

The system includes a state determining module 610, an optional target gear determining module 620, a target gear determining module 630 and a gear shifting module 640.

The state determining module 610 is configured to determine a state of a battery according to a remaining capacity of the battery, a required power and a state of the hybrid electric vehicle, in which the state of the battery includes a discharging state or a charging state.

The optional target gear determining module 620 is configured to determine a plurality of optional target gears and to determine a torque and a rotating speed of an engine corresponding to each optional target gear according to the state of the battery and a speed of the hybrid electric vehicle.

The target gear determining module 630 is configured to select an optional target gear with a minimum fuel consumption of the engine as a target gear from the plurality of optional target gears.

The gear shifting module 640 is configured to determine whether to perform a gear shifting by comparing with a current gear.

In embodiments of the present disclosure, the state determining module 610 includes a first state determining unit, a second state determining unit, a third state determining unit, a fourth determining unit and a fifth state determining unit (not shown in FIG. 6).

The first state determining unit is configured to determine the battery is in the discharging state, if the remaining capacity of the battery is larger than a first threshold.

The second state determining unit is configured to determine the battery is in the charging state, if the remaining capacity of the battery is less than a second threshold, in which the second threshold is less than the first threshold.

The third state determining unit is configured to determine the battery is in the discharging state, if the remaining capacity of the battery is larger than the second threshold and less than the first threshold and the required torque is larger than a predetermined threshold.

The fourth state determining unit is configured to keep the battery in a previous state, if the remaining capacity of the battery is larger than the second threshold and less than the first threshold and the required torque is less than or equal to the predetermined threshold.

The fifth state determining unit is configured to set the battery in the discharging state without considering the remaining capacity of the battery, if the hybrid electric vehicle has just been started.

In embodiments of the present disclosure, the optional target gear determining module 620 includes a first judging unit, a first optional target gear determining unit and a second f optional target gear determining unit.

The first judging unit is configured to determine whether the speed of the hybrid electric vehicle is larger than a minimum speed, if the engine is in an idling speed.

The first optional target gear determining unit is configured to determine a starting gear as the optional target gear, if the speed of the hybrid electric vehicle is less than or equal to the minimum speed.

The second optional target gear determining unit configured to determine a plurality of available gears corresponding to the speed of the hybrid electric vehicle according to a predetermined maximum torque and a predetermined minimum torque of the engine, if the speed of the hybrid electric vehicle is larger than the minimum speed, and to obtain the plurality of optional target gears from the plurality of available gears and the torque and the rotating speed of the engine corresponding to each optional target gear according to the state of the battery.

In embodiments of the present disclosure, the second optional target gear determining unit includes a first determining sub-unit. When the battery is in the discharging state, a motor of the hybrid electric vehicle works in a power assistance mode and the first determining sub-unit is configured to: determine a minimum assisted torque and a maximum assisted torque of the motor, to determine an output torque of the engine corresponding to each available gear under the speed of the hybrid electric vehicle, and to judge whether one or more gears exist such that the required torque is satisfied when the engine outputs the output torque and an assisted torque of the motor is between the minimum assisted torque and the maximum assisted torque.

If one or more gears exist such that the required torque is satisfied when the engine outputs the output torque and an assisted torque of the motor is between the minimum assisted torque and the maximum assisted torque, the first determining sub-unit is configured to determine the one or more gears as the plurality of optional target gears and to obtain the torque and the rotating speed of the engine corresponding to each optional target gear; if not, the first determining sub-unit is configured to determine whether one or more gears exist such that the requires torque is satisfied just by the engine.

If one or more gears exist such that the requires torque is satisfied just by the engine, the first determining sub-unit is further configured to determine the one or more gears as the plurality of optional target gears and to obtain the torque and the rotating speed of the engine corresponding to each optional target gear; if not, the first determining sub-unit is configured to determine whether one or more gears exist such that the required torque is satisfied when the motor outputs the maximum assisted torque and the engine provides the rest torque.

If one or more gears exist such that the required torque is satisfied when the motor outputs the maximum assisted torque and the engine provides the rest torque, the first determining sub-unit is configured to determine the one or more gears as the plurality of optional target gears and obtain the torque and the rotating speed of the engine corresponding to each optional target gear.

In embodiments of the present disclosure, the second optional target gear determining unit further includes a second determining sub-unit. When the battery is in the charging state, a motor works in a power generation mode and the second determining sub-unit is configured to: determine a minimum power generating torque and a maximum power generating torque of the motor, to determine an output torque of the engine corresponding to each available gear under the speed of the hybrid electric vehicle and to judge whether one or more gears exist such that the required torque is satisfied when the engine outputs the output torque and a power generating torque of the motor is between the minimum power generating torque and the maximum power generating torque.

If one or more gears exist such that the required torque is satisfied when the engine outputs the output torque and a power generating torque of the motor is between the minimum power generating torque and the maximum power generating torque, the second determining sub-unit is configured to determine the one or more gears as the plurality of optional target gears and to obtain the torque and the rotating speed of the engine corresponding to each optional target gear; if not, the second determining sub-unit is configured to determine whether one or more gears exist such that a sum of the maximum power generating torque of the motor and the required torque is satisfied by the output torque of the engine.

If one or more gears exist such that a sum of the maximum power generating torque of the motor and the required torque is satisfied by the output torque of the engine, the second determining sub-unit is configured to determine the one or more gears as the plurality of optional target gears and to obtain the torque and the rotating speed of the engine corresponding to each optional target gear; if not, the second determining sub-unit is configured to obtain a corresponding gear as the optional target gear when only the engine operates and obtain the torque and the rotating speed of the engine corresponding to each optional target gear.

In embodiments of the present disclosure, the target gear determining unit 630 is configured to: determine a fuel consumption of the engine in each optional target gear according to the torque and the rotating speed of the engine corresponding to each optional target gear and by using a universal characteristic of the engine, and to select the optional target gear with the minimum fuel consumption of the engine as the target gear.

In embodiments of the present disclosure, the gear shifting unit 640 is configured to: determine whether a time interval between a previous gear shift and the gear shift to be performed is larger than a threshold. If yes, gear shifting unit 640 is configured to perform the gear shift according to the target gear; and if not, the gear shifting unit 640 is configured to keep the hybrid electric vehicle in the current gear.

The system for shifting the gear according to embodiments of the present disclosure is suitable for a mild hybrid electric vehicle, a medium hybrid electric vehicle and a full hybrid electric vehicle.

With the system for shifting the gear of the hybrid electric vehicle according to embodiments of the present disclosure, a fuel consumption of the engine is taken into consideration to determine the target gear, and thus a great energy saving can be obtained, and a control of the system for shifting the gear of the hybrid electric vehicle is easy to perform. Therefore, the system for shifting the gear of the hybrid electric vehicle is easy to control, familiar with environment and saves energy.

One or more exemplary embodiments of the present disclosure solve at least one of the problems existing in the related art to at least some extent, and thus provide a method for shifting a gear of a hybrid electric vehicle which is simple to control, familiar to environment and saves energy.

It will be understood that, the flow charts, algorithms, or any process or method described herein may represent a module, segment, or portion of code that comprises one or more executable instructions to implement the specified logic function(s) or that comprises one or more executable instructions of the steps of the progress. And the scope of an embodiment of the present disclosure includes other implementations in which the order of execution may differ from that which is depicted in the flow chart, which should be understood by those skilled in the art.

The logic and steps described in the flow charts, algorithms, processes or methods may, for example, include a scheduling list of an executable instructions to implement the specified logic function(s), and can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "non-transitory computer-readable medium" can be any physical medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

The instruction execution system may for example contain a processor, a memory, and executable instructions stored in the memory for performing the various acts of the method. When executing the method, the instruction execution system may process information received from one or more sensors of the hybrid power system and/or vehicle or from parameters stored in a memory such as an information database, and may generate outputs such as information, commands, data, signals, etc. for implementing the method. These outputs may be stored in memory or applied to respective devices within the vehicle, such as appropriate actuators, etc. For example, a decision to change gears may generate a signal that commands an actuator in the transmission to shift from one gear to another gear.

Those skilled in the art shall understand that all or parts of the steps in the above exemplifying method of the present disclosure may be achieved by commanding the related hardware with programs. The programs may be stored in a non-transitory computer readable storage medium, and the programs comprise one or a combination of the steps in the method embodiments of the present disclosure when run on a computer.

In addition, each function cell of embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a non-transitory computer readable storage medium. In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise. Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for shifting a gear of a hybrid electric vehicle, comprising the following acts performed by a gear shifting system of the vehicle:
   determining a remaining capacity of a battery relative to a first threshold and a second threshold, wherein the second threshold is less than the first threshold;
   determining a state of the battery based on the remaining capacity, wherein:
      the battery is determined to be in a discharging state if the remaining capacity of the battery is larger than the first threshold;
      the battery is determined to be in a charging state if the remaining capacity of the battery is less than the second threshold; and
      if the remaining capacity of the battery is between the first threshold and the second threshold:
         further determining whether a required torque is larger than a predetermined threshold;
         determining the battery is in the discharging state, if the required torque is larger than the predetermined threshold; and
         keeping the battery in a previous state, if the required torque is less than or equal to the predetermined threshold;
   determining the battery is in the discharging state without considering the remaining capacity of the battery, if the hybrid electric vehicle has just been started;
   determining a plurality of optional target gears and a torque and a rotating speed of an engine corresponding to each optional target gear according to the state of the battery and a speed of the hybrid electric vehicle;
   selecting an optional target gear with a minimum fuel consumption of the engine as a target gear from the plurality of optional target gears; and
   comparing the selected optional target gear with a current gear and performing a gear shift as based on the comparison.

2. The method according to claim 1, wherein determining a plurality of optional target gears and a torque and a rotating speed of an engine corresponding to each optional target gear according to the state of the battery and a speed of the hybrid electric vehicle comprises:
   determining whether the engine is in an idling state;
   judging whether the speed of the hybrid electric vehicle is larger than a minimum speed, if the engine is in the idling state;
   determining a starting gear as the optional target gear, if the speed of the hybrid electric vehicle is less than or equal to the minimum speed;
   determining a plurality of available gears corresponding to the speed of the hybrid electric vehicle according to a predetermined maximum rotating speed and a predetermined minimum rotating speed of the engine, if the speed of the hybrid electric vehicle is larger than the minimum speed, and obtaining the plurality of optional target gears from the plurality of available gears and the torque and the rotating speed of the engine corresponding to each optional target gear according to the state of the battery.

3. The method according to claim 2, wherein when the battery is in the discharging state, a motor of the hybrid electric vehicle works in a power assistance mode, and obtaining the plurality of optional target gears from the plurality of available gears and the torque and the rotating speed of the engine corresponding to each optional target gear according to the state of the battery comprises:

determining a minimum assisted torque and a maximum assisted torque of the motor;

determining an output torque of the engine corresponding to each available gear under the speed of the hybrid electric vehicle;

judging whether one or more gears exist such that the required torque is satisfied when the engine outputs the output torque and an assisted torque of the motor is between the minimum assisted torque and the maximum assisted torque;

if yes, determining the one or more gears as the plurality of optional target gears and obtaining the torque and the rotating speed of the engine corresponding to each optional target gear;

if not, determining whether one or more gears exist such that the required torque is satisfied just by the engine;

if yes, determining the one or more gears as the plurality of optional target gears and obtaining the torque and the rotating speed of the engine corresponding to each optional target gear;

if not, determining whether one or more gears exist such that the required torque is satisfied when the motor outputs the maximum assisted torque and the engine provides the rest torque;

if yes, determining the one or more gears as the plurality of optional target gears and obtaining the torque and the rotating speed of the engine corresponding to each optional target gear.

4. The method according to claim 2, wherein when the battery is in the charging state, a motor works in a power generation mode, and obtaining the plurality of optional target gears from the plurality of available gears and the torque and the rotating speed of the engine corresponding to each optional target gear according to the state of the battery comprises:

determining a minimum power generating torque and a maximum power generating torque of the motor;

determining an output torque of the engine corresponding to each available gear under the speed of the hybrid electric vehicle;

judging whether one or more gears exist such that the required torque is satisfied when the engine outputs the output torque and a power generating torque of the motor is between the minimum power generating torque and the maximum power generating torque;

if yes, determining the one or more gears as the plurality of optional target gears and obtaining the torque and the rotating speed of the engine corresponding to each optional target gear;

if not, determining whether one or more gears exist such that a sum of the maximum power generating torque of the motor and the required torque is satisfied by the output torque of the engine;

if yes, determining the one or more gears as the plurality of optional target gears and obtaining the torque and the rotating speed of the engine corresponding to each optional target gear;

if not, obtaining a corresponding gear as the optional target gear when only the engine works and obtaining the torque and the rotating speed of the engine corresponding to each optional target gear.

5. The method according to claim 1, wherein selecting an optional target gear with a minimum fuel consumption of the engine as a target gear from the plurality of optional target gears comprises:

determining a fuel consumption of the engine in each optional target gear according to the torque and the rotating speed of the engine corresponding to each optional target gear and by using a universal characteristic of the engine; and selecting the optional target gear with the minimum fuel consumption of the engine as the target gear.

6. The method according to claim 1, wherein determining whether to perform a gear shift by comparing with a current gear comprises:

determining whether a time interval between a previous gear shift and the gear shift to be performed is larger than a threshold;

if yes, performing the gear shift according to the target gear; and if not, keeping the hybrid electric vehicle in the current gear.

7. A system for shifting a gear of a hybrid electric vehicle, comprising:

a non-transitory computer-readable medium comprising computer-executable instructions stored thereon; and an instruction execution system, which is configured by the instructions to implement acts of:

determining a remaining capacity of a battery relative to a first threshold and a second threshold, wherein the second threshold is less than the first threshold;

determining a state of the battery based on the remaining capacity, wherein:

the battery is determined to be in a discharging state if the remaining capacity of the battery is larger than the first threshold;

the battery is determined to be in a charging state if the remaining capacity of the battery is less than the second threshold; and if the remaining capacity of the battery is between the first threshold and the second threshold:

further determining whether a required torque is larger than a predetermined threshold;

determining the battery is in the discharging state, if the required torque is larger than the predetermined threshold; and keeping the battery in a previous state, if the required torque is less than or equal to the predetermined threshold;

determining the battery is in the discharging state without considering the remaining capacity of the battery, if the hybrid electric vehicle has just been started;

determining a plurality of optional target gears and a torque and a rotating speed of an engine corresponding to each optional target gear according to the state of the battery and a speed of the hybrid electric vehicle;

selecting an optional target gear with a minimum fuel consumption of the engine as a target gear from the plurality of optional target gears; and comparing the selected optional target gear with a current gear and performing a gear shift based on the comparison.

8. The system according to claim 7, wherein the instruction execution system is configured to implement the act of determining a plurality of optional target gears and a torque and a rotating speed of an engine corresponding to each optional target gear according to the state of the battery and a speed of the hybrid electric vehicle by acts of:

determining whether the engine is in an idling state;

judging whether the speed of the hybrid electric vehicle is larger than a minimum speed, if the engine is in the idling state;

determining a starting gear as the optional target gear, if the speed of the hybrid electric vehicle is less than or equal to the minimum speed;

determining a plurality of available gears corresponding to the speed of the hybrid electric vehicle according to a predetermined maximum rotating speed and a predetermined minimum rotating speed of the engine, if the speed of the hybrid electric vehicle is larger than the minimum speed, and obtaining the plurality of optional target gears from the plurality of available gears and the torque and the rotating speed of the engine corresponding to each optional target gear according to the state of the battery.

9. The system according to claim 8, wherein when the battery is in the discharging state, a motor of the hybrid electric vehicle works in a power assistance mode and the instruction execution system is configured to implement the act of obtaining the plurality of optional target gears from the plurality of available gears and the torque and the rotating speed of the engine corresponding to each optional target gear according to the state of the battery by acts of:

determining a minimum assisted torque and a maximum assisted torque of the motor;

determining an output torque of the engine corresponding to each available gear under the speed of the hybrid electric vehicle;

judging whether one or more gears exist such that the required torque is satisfied when the engine outputs the output torque and an assisted torque of the motor is between the minimum assisted torque and the maximum assisted torque;

if yes, determining the one or more gears as the plurality of optional target gears and obtain the torque and the rotating speed of the engine corresponding to each optional target gear;

if not, determining whether one or more gears exist such that the requires torque is satisfied just by the engine;

if yes, determining the one or more gears as the plurality of optional target gears and obtain the torque and the rotating speed of the engine corresponding to each optional target gear;

if not, determining whether one or more gears exist such that the required torque is satisfied when the motor outputs the maximum assisted torque and the engine provides the rest torque;

if yes, determining the one or more gears as the plurality of optional target gears and obtain the torque and the rotating speed of the engine corresponding to each optional target gear.

10. The system according to claim 8, wherein when the battery is in the charging state, a motor works in a power generation mode and the instruction execution system is configured to implement the act of obtaining the plurality of optional target gears from the plurality of available gears and the torque and the rotating speed of the engine corresponding to each optional target gear according to the state of the battery by acts of:

determining a minimum power generating torque and a maximum power generating torque of the motor;

determining an output torque of the engine corresponding to each available gear under the speed of the hybrid electric vehicle;

judging whether one or more gears exist such that the required torque is satisfied when the engine outputs the output torque and a power generating torque of the motor is between the minimum power generating torque and the maximum power generating torque;

if yes, determining the one or more gears as the plurality of optional target gears and obtain the torque and the rotating speed of the engine corresponding to each optional target gear;

if not, determining whether one or more gears exist such that a sum of the maximum power generating torque of the motor and the required torque is satisfied by the output torque of the engine;

if yes, determining the one or more gears as the plurality of optional target gears and obtain the torque and the rotating speed of the engine corresponding to each optional target gear;

if not, obtaining a corresponding gear as the optional target gear when only the engine operates and obtain the torque and the rotating speed of the engine corresponding to each optional target gear.

11. The system according to claim 7, wherein the instruction execution system is configured to implement the act of selecting an optional target gear with a minimum fuel consumption of the engine as a target gear from the plurality of optional target gears by acts of:

determining a fuel consumption of the engine in each optional target gear according to the torque and the rotating speed of the engine corresponding to each optional target gear and by using a universal characteristic of the engine; and selecting the optional target gear with the minimum fuel consumption of the engine as the target gear.

12. The system according to claim 7, wherein the instruction execution system is configured to implement the act of comparing the selected optional target gear with a current gear and performing a gear shift based on the comparison by acts of:

determining whether a time interval between a previous gear shift and the gear shift to be performed is larger than a threshold;

if yes, performing the gear shift according to the target gear; and if not, keeping the hybrid electric vehicle in the current gear.

* * * * *

UNITED STATES PATENT AND TRADEMARK OFFICE
CERTIFICATE OF CORRECTION

PATENT NO.       : 9,701,303 B2
APPLICATION NO.  : 14/743639
DATED            : July 11, 2017
INVENTOR(S)      : Weibin Yang It is certified that error appears in the above-identified patent and that said Letters Patent is hereby corrected as shown below:

In the Claims

Claim 9, Column 23, Line 53, delete "requires" and insert --required--

Signed and Sealed this
Twenty-sixth Day of March, 2019

Andrei Iancu
*Director of the United States Patent and Trademark Office*